United States Patent [19]

Kato et al.

[11] Patent Number: 4,592,636
[45] Date of Patent: Jun. 3, 1986

[54] VIEW FINDER OPTICAL SYSTEM

[75] Inventors: Masatake Kato, Tokyo; Tetsuharu Nishimura; Hideo Yokota, both of Kanagawa, all of Japan

[73] Assignee: Canon Kabushiki Kaisha, Tokyo, Japan

[21] Appl. No.: 729,292

[22] Filed: May 1, 1985

[30] Foreign Application Priority Data

| May 7, 1984 | [JP] | Japan | 59-90762 |
| May 7, 1984 | [JP] | Japan | 59-90763 |
| May 7, 1984 | [JP] | Japan | 59-90764 |
| May 23, 1984 | [JP] | Japan | 59-75564[U] |
| May 23, 1984 | [JP] | Japan | 59-75565[U] |
| May 23, 1984 | [JP] | Japan | 59-75566[U] |
| Jun. 11, 1984 | [JP] | Japan | 59-119473 |
| Jun. 18, 1984 | [JP] | Japan | 59-90478[U] |

[51] Int. Cl.$^4$ ............................................. G03B 13/02
[52] U.S. Cl. ..................................... 354/225; 354/155
[58] Field of Search ................................ 354/225, 155

[56] References Cited

U.S. PATENT DOCUMENTS 3,541,919  11/1970  Weyrauch ........................... 354/225
4,021,823  5/1977  Miyata ............................. 354/225 X Primary Examiner—Michael L. Gellner
Attorney, Agent, or Firm—Toren, McGeady, Stanger, Goldberg & Kiel

[57] ABSTRACT

A view finder optical system comprises an optical path split mirror which divides a second optical axis from a first optical axis of an objective optical system; a predetermined image forming plane arranged on the second optical axis to have an image coming from the objective optical system formed thereon; a first prism arranged along the second optical axis to bring about reflection twice on the second optical axis and to have the incidence plane thereof and a second reflection plane on the same plane; a second prism which is disposed behind the first prism and is provided with a roof type reflection plane for a first reflection and a reflection plane for further reflecting the second optical axis after the second optical axis is reflected by the roof type reflection plane; and an eye-piece on the second optical axis after it comes out from the second prism. The spacing distance between the first optical axis and the optical axis passing through the eye-piece is shorter than a distance between the first optical axis and the predetermined image forming plane. An optical axis which passes through the exit plane of the first prism is arranged to be tilting to an axis which is perpendicular to the exit plane of the first prism.

12 Claims, 22 Drawing Figures

VIEW FINDER OPTICAL SYSTEM

BACKGROUND OF THE INVENTION

1. Field of the Invention

This invention relates to a view finder optical system and more particularly to a view finder optical system highly suited for a single-lens reflex camera and for a so-called electronic camera of a TTL optical system using a camera tube or a solid-state image sensor such as a CCD.

2. Description of the Prior Art

Heretofore, single-lens reflex cameras of the kind using a pentagonal roof type prism for 35 mm film have advanced to a great extent as this kind of camera is most suited for expansion of camera systems. FIG. 1 of the accompanying drawings schematically shows the view finder optical system of a typical single-lens reflex camera. Referring to FIG. 1, the illustration includes a total reflection mirror 101, a shutter unit 102, a film surface 103, a focusing screw 104, a pentagonal roof type prism 105, an eye-piece 106 and a pupil 107 for observation. The view finder optical system shown in FIG. 1 excels in optical performance having more than 90% field ratio which means a ratio of an image plane to be photographed on the film surface to the image of an object observable through the view finder optical system and also having a field magnification $\gamma$ of at least 0.8 with a standard lens mounted on the camera. It is a feature of this view finder optical system that it permits the whole of the camera to be compactly arranged.

In cases where the above-stated pentagonal roof type prism 105 is used for the view finder optical system of an electronic camera using an image sensor such as a CCD, it becomes difficult to obtain the same field ratio and the same field magnification as those of the conventional single-lens reflex camera. Furthermore, in that event, it becomes difficult to compactly arrange the whole apparatus. The reasons for these difficulties are as described below:

(i) The effective image plane of an image sensor, for example, of ⅔ inch is smaller than the 35 mm film and is about ¼ of the latter in the ratio of diagonal length. Therefore, with the conventional pentagonal roof type prism 105 employed, the optical path length becomes too long to obtain a high field ratio and a high degree of field magnification.

(ii) An electrical processing circuit requires a large space behind the image sensor. This causes a distance between the image plane of the photo-taking lens and the hindmost end of the camera. Then, the pupil 107 position of the view finder optical system must be arranged farther in the rear part of the camera. As a result of this, it becomes difficult to obtain a high field ratio and a high degree of field magnification.

(iii) The photo-taking lens is arranged in a telecentric structure for color separation. This causes an effective light flux from the photo-taking lens to spread to a greater extent at a part where the view finder optical path is parted. Therefore, the size of the reflection mirror 101 becomes larger.

(iv) The optical members such as a low-pass filter, an infrared ray cut filter, protection glass, etc. which are disposed in front of the image sensor require a large space. This necessitates a long distance between the view finder optical path splitting point and the image sensing plane. As a result, the size of the camera as a whole increases.

Next, an example of a view finder optical system which is intended to attain at least a 90% field ratio by using a conventional pentagonal roof type prism 210 for an electronic camera is arranged as shown in FIG. 2. The illustration includes a photo-taking lens 200; a split unit 201 which is arranged to split the photo-taking optical path to obtain an optical path leading to the view finder optical system; a low-path filter 202; a shutter unit 203; an image sensing surface 204 of an image sensor; an image sensor package 205 provided with a protection glass which has an infrared cutting effect and is disposed in front of the sensor package; a view finder optical system unit 206 which includes an erecting image system; a focusing screen; an electrical processing circuit unit 208 which is arranged to electrically process an image sensing signal; and a pupil 209 for observation.

Generally, the larger the field magnification $\gamma$, the more easily the view finder image is observable. The field magnification $\gamma$ can be expressed as $\gamma = f\theta/fe$, where $f\theta$ represents the standard focal length of the photo-taking lens 200 and fe the focal length of the eye-piece 211. Since the focal length of the standard lens 200 is almost unvarying, in order to make the field magnification $\gamma$ larger, the focal length fe of the eye-piece 211 must be shortened.

The eye-piece 211 is arranged to have its front side focal point close to the finder image forming plane of the view finder optical system 206. Therefore, in order to increase the field magnification $\gamma$, the optical path length of the optical system 206 arranged to obtain a positive erecting image between the focusing screen and the eye-piece 211 must be shortened.

Assuming that the focal length $f\theta$ is arranged to be $f\theta = 12.5$ mm to correspond to the standard lens 200 for a ⅔ inch image sensor and the field magnification $\gamma$ to be $\gamma = 0.6$, the focal length fe becomes fe = 20.8 mm.

Further, in order to obtain a high field ratio, it is necessary to have a focusing screen which is of about the same size as that of the effective image sensing image plane and an erecting image system which is large enough for forming some optical path that permits adequate observation of the focusing screen. In the arrangement shown in FIG. 2, therefore, in order to obtain at least a 90% field ratio and at least a field magnification of $\gamma = 0.6$, the following arrangement is necessary: First, the optical path length from the focusing screen to the principal point in front of the eye-piece 211 is arranged to be 20.8 mm which is approximately equal to the focal length of the eye-piece 211. In addition to that, light from the focusing screen must be arranged to be sufficiently incident on the eye-piece 211. It is possible to find a pentagonal roof type prism capable of meeting such a requirement. However, the pentagonal roof type prism 210, as shown in FIG. 2, must be disposed in a foremost part within the view finder unit 206 while the eye-piece 211 must be arranged to be adjacent to the exit plane of the pentagonal roof type prism 210. Meanwhile, the pupil 209 for observation must be arranged to be far away from the eye-piece 211 and positioned behind the rear end of the camera. However, since a principal ray is incident on the eye-piece 211 in parallel with the optical axis, the pupil 209 position is located at a distance about equal to the focal length from the second principal point behind the eye-piece 211. Therefore, as shown in FIG. 2, in order to have the eye-piece 211 and the position of the pupil 209 separated at a great distance from each other, the distance between the first and second principal points of the eye-piece 211 must be arranged to be long. Such an arrangement is extremely difficult. In the case of the electronic camera or the like having a relatively small effective image or picture plane, therefore, use of the pentagonal roof type prism 210 for the view finder optical system 206 makes it extremely difficult to obtain a high field ratio and a high field magnification because of optical performance.

Meanwhile, the conventional view finder optical system 206 using the pentagonal roof type prism 210 has some space left over to permit information display light to be readily introduced from behind the focusing screen. However, with a large space used along the view finder optical axis for insertion of a light source and a display element for information displayed between the focusing screen and the plane of incidence of the prism 210 results in a longer length of the optical path between the focusing screen and the eye-piece 211. The longer optical path then results in a lower field magnification and is not desirable.

Further, if the focal length of the eye-piece 211 is shortened for the purpose of increasing the field magnification, even a slight discrepancy between the focusing screen and an information display surface (the position of the light source or the display element) results in a great deviation of diopter.

While the above-stated problems result from the optical arrangement, there are the following problems in terms of manufacturing and assembling processes: For example, if the relative positions of the focusing screen and the view finder prism 210 deviate during the manufacture, the position of a field image on the final exit plane of the prism 210 deviates and thus the image is either eclipsed or becomes squinted.

Japanese Laid-Open Utility Model Application No. SHO 56-53372 has disclosed a view finder which resembles in appearance the view finder optical system of an embodiment of this invention which will be described later herein. The view finder disclosed, however, essentially differs from that of this invention as it is designed for the use of a much larger film than the 35 mm silver halide film. Two marginal rays have a convergent inclination. This is because an eye-piece of a long focal length can be used for a camera which has a large picture plane. In such a case, a sufficient observation pupil distance can be secured even if the marginal rays are convergent. Therefore, it is not necessary to use a prism which is large relative to the size of the camera body. If the size of the picture plane is small, however, in order to make the focal length of the eye-piece shorter for the purpose of obtaining a high magnification, the marginal rays must be arranged to be as parallel as possible with each other. Then, the arrangement disclosed by the above-stated Japanese utility model would result in a large prism.

Meanwhile, Japanese Laid-Open Utility Model Application No. SHO 49-117841 has disclosed a view finder arrangement in FIG. 1 thereof. In this case, the second reflection plane of a first prism seems to require a specular treatment as it fails to satisfy a condition required for total reflection. Then, since the incident area and the reflection area of a light flux cannot be arranged to overlap each other, the arrangement disclosed in FIG. 1 inevitably causes an increase in the size of the first prism. In another arrangement disclosed in FIG. 2, the light flux can be totally reflected. However, since the incidence plane is slanted in this case, this arrangement necessitates some additional arrangement to correct astigmatism or distortion at some other part.

A first object of this invention is to provide a view finder optical system which has a high field ratio and a high field magnification and is highly suited for a camera having a relatively small photo-taking image plane.

A more specific object of this invention is to provide a compact view finder optical system having at least 90% field ratio and about a 0.6 field magnification.

Another object of this invention is to display information in the neighborhood of a view finder field.

A further object of this invention is to provide an optical element which can be precisely mounted in a predetermined position on a framework within a camera.

A still further object of this invention is to prevent a ghost image from occurring within a view finder field.

SUMMARY OF THE INVENTION

A view finder optical system including optical path splitting means for dividing a second optical axis from a first optical axis of an objective optical system; a predetermined image forming plane arranged on the second optical axis to form thereon an image which is obtained by the objective optical system; a first prism arranged behind the predetermined image forming plane to bring about reflection an even number of times on the second optical axis, the second optical axis which comes out from the exit plane of the first prism being arranged to slant relative to an axis perpendicular to the exit plane; a second prism which is disposed behind the first prism and is provided with a roof type reflection plane for effecting a first reflection and a reflection plane for further reflecting the second optical axis after the second optical axis is reflected by the roof type reflection plane; and an eye-piece having an optical axis which coincides with the second optical axis coming out from the second prism, a distance between the first optical axis and the optical axis of the eye-piece being arranged to be shorter than a distance between the first optical axis and the predetermined image forming plane.

DETAILED DESCRIPTION OF THE PREFERRED EMBODIMENTS

Figure 1:
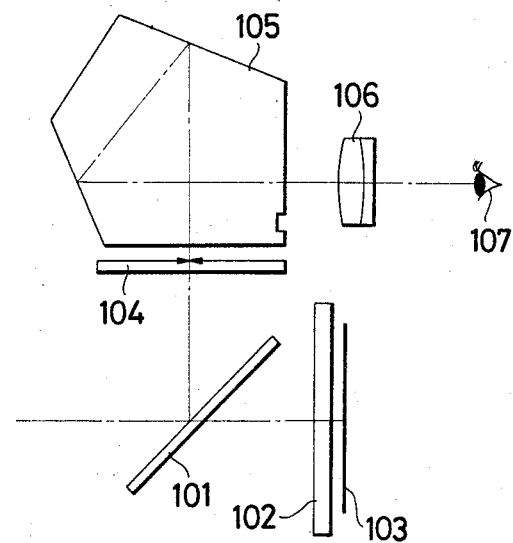
FIG. 1 is a schematic illustration showing a part of an optical system of the conventional single-lens reflex camera.
Figure 2:
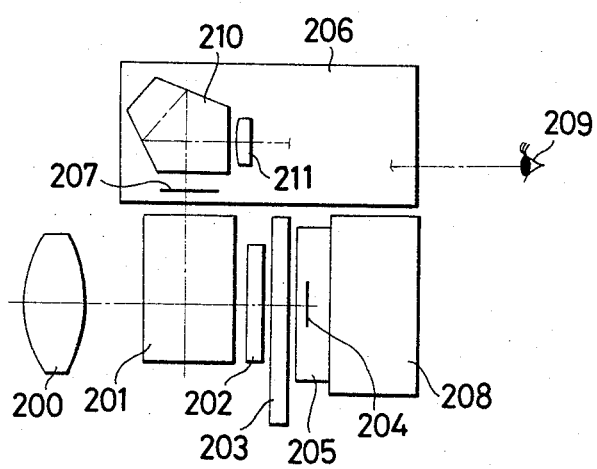
FIG. 2 is a schematic illustration of a part of an optical system of an electronic camera using a pentagonal roof type prism.
Figure 3:
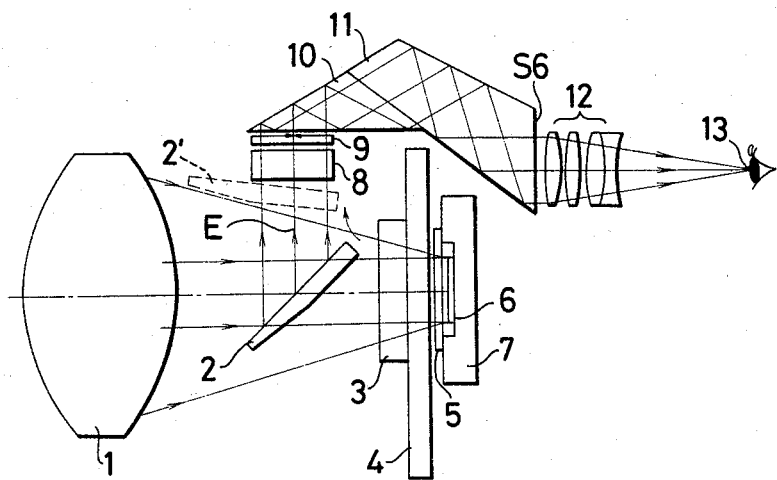
FIG. 3 is an illustration of a view finder optical system embodying this invention.

FIG. 3 shows an embodiment of this invention wherein a view finder optical system is applied to an electronic camera. The illustration includes a photo-taking lens 1; a movable mirror 2 which is arranged to be retractable to a position 2' indicated by a broken line in taking a photograph; a low-pass filter 3; a shutter unit 4; a protection glass 5; an image sensing plane 6; and an image sensor package 7. A light flux which comes from an object passing through the photo-taking lens 1 is reflected by the movable mirror 2. The reflected light passes through an optical path correction plate 8 which is arranged to give an aberration to the same degree as the spherical aberration of a photo-taking optical system. Then, the light flux is imaged on a view finder image forming plane 9 of a focusing screen arranged in a position approximately optically equal to the image sensing plane 6 relative to the movable mirror 2. The object image thus obtained is made into a positive erecting image through a first prism 10 and a second roof-shaped prism 11 and becomes observable at the position of an observation pupil 13 through an eye-piece 12.

A feature of this invention is as follows: In the arrangement shown in FIG. 3, a ray of light E which travels along the optical axis of the photo-taking lens 1 is reflected by the movable mirror 2 and then travels along the optical axis of the view finder to come out of the second prism 11. At that time, the ray of light E becomes approximately parallel to the optical axis of the photo-taking lens 1 and is preferably at an angle within ±10 degrees relative to the optical axis of the lens 1. By this arrangement, a view finder image is observable in the same direction as the photo-taking lens 1. This feature of the invention facilitates a photographing operation particularly on a moving object.

Another feature of the invention resides in that: The first and second prisms 10 and 11 are shaped in such a manner that the exit point of the ray E from the second prism 11 is closer to the optical axis of the photo-taking lens 1 than the image forming plane 9 of the view finder. By virtue of this arrangement, the optical path length from the image forming plane 9 to the eye-piece 12 can be kept at an apposite length, so that a high field ratio and a high degree of field magnification can be attained without difficulty.

A further feature of the invention resides in that: The distance between the incident point of the ray E on the first prism 10 and an exit plane S6 of the second prism 11 is arranged to be short to permit reduction in size of the view finder optical system. Further, a part of the second prism 11 is arranged to be located within a relatively large space available in the neighborhood of the image sensing plane 6 to further permit reduction in size of the whole camera.

Figure 4:
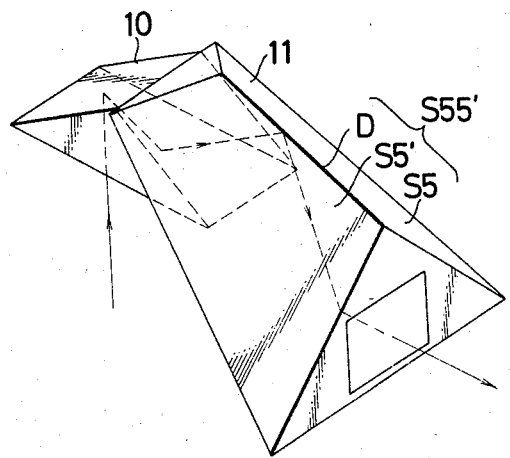
FIGS. 4 and 5 are illustrations of parts of the optical system shown in FIG. 3.

FIG. 4 shows in an oblique view the first and second prisms 10 and 11 of FIG. 3. As shown, the first prism 10 is in a triangular pyramid shape. The second prism 11 is provided with a roof part S55' which includes an edge line D and reflection planes S5 and S5'.

Figure 5:
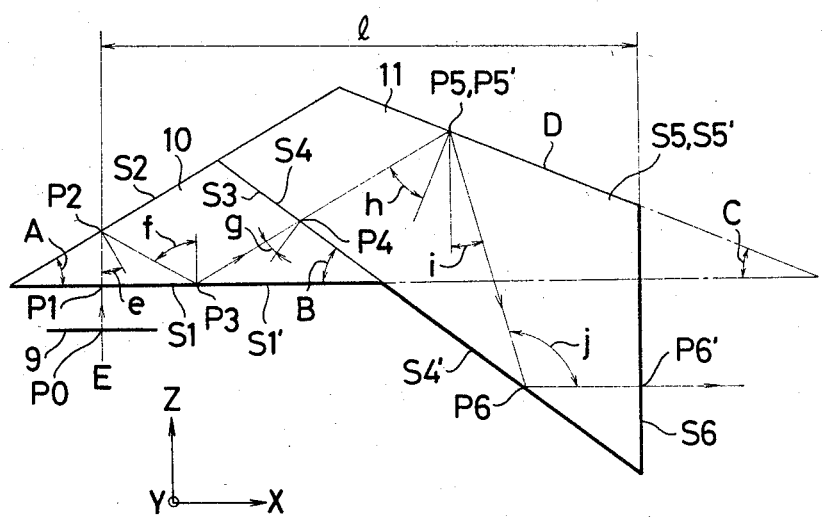

FIG. 5 shows the shapes of the first and second prisms 10 and 11 and the optical path of the light incident on the first and second prisms 10 and 11. In FIG. 5, for the sake of description of optical paths, a coordinate system is assumed to be on an incidence plane S1 of the first prism 10 taking an axis x in the direction of the optical axis of the photo-taking lens 1, an axis y in the direction perpendicular to the axis x, and another axis z in the direction perpendicular to the incidence plane S1. This incidence plane S1 of the first prism 10 is parallel with a plane which includes the optical axis of the photo-taking lens 1.

Referring to FIG. 5, the ray of light E which is on the optical axis of the view finder is approximately perpendicularly incident on the incidence plane S1 of the first prism 10. The incident ray E is reflected by a first reflection plane S2 which is coated with a vapor-deposited reflection film. The reflected ray E is then totally reflected by a second reflection plane which is located approximately on the same plane as the incidence plane S1. The ray E then comes out from an exit plane S3 of the first prism 10. After that, the ray E comes to an incidence plane S4 of the second prism 11 to be reflected backward by the roof S55' including the reflection planes S5 and S5' which are coated with vapor-deposited reflection films. The backward reflected ray E is reflected by a fourth reflection plane S4' which is located approximately on the same plane as the incidence plane S4. After being reflected by the reflection plane S4', the ray E approximately perpendicularly comes out from the exit plane S6. The ray E then comes to the eye-piece 12. In this specific embodiment, the reflection mirror 2 shown in FIG. 3 turns the image upside down. After that, the image is twice turned upside down by the first and second reflection planes S2 and S1'. Then, the left, right, upper and lower sides of the image are inverted by the roof S55' of the second prism 11. The image is further turned upside down by the fourth reflection plane S4' to eventually obtain a positive erected image.

Further, in this specific embodiment, to facilitate assembly work, the incidence plane S1 and the second reflection plane S1' are preferably arranged on the same plane while the incidence plane S4 and the fourth reflection plane S4' are preferably arranged also on the same plane. However, in order to vary or adjust the optical path length and the exit position of the rays of light, they may be arranged on stepwise differentiated planes.

Each of the first and second prisms 10, 11 may be formed by cementing together two or more prisms. Meanwhile, the first and second prism 10, 11 may be either cemented together or arranged leave some slight clearance between them.

The angles which determines the shapes of the first and second prisms 10 and 11 are arranged in the following manner: Assuming that an angle defined by the incidence plane S1 and the first reflection plane S2 of the first prism 10 is A and an angle defined by the edge line D of the roof S55' of the second prism 11 and the incidence plane S1 is C, an angle B which is defined by the incidence plane S1 and the exit plane S3 as shown in FIG. 5 can be determined by a formula: $B=45°-A+C$. Then, assuming that the incident angles of the view finder optical axis on the different planes of the prism 10, 11 are e, f, g, and h and an angle defined by the incident light on the incidence plane S4 at the last reflection and the exit light is j, there are obtained the following relations: $e=A$, $f=2A$, $g=2A-B$, $h=2A-C$ and $j=90°+2(A-C)$.

Tables 1, 2 and 3 show, by way of numerical example, the specific values which define the shapes of the first and second prisms 10 and 11 on the basis of the coordinates shown in FIG. 5 according to this invention.

With the angles A and C of FIG. 5 determined, the normal directions of the faces or planes of the first and second prisms 10 11 all can be determined. Further, each plane or face is unconditionally defined with a normal and a point on the plane determined. Therefore, each of the above-stated tables shows these angles and arbitrary coordinates on each plane. Each of the numerical examples given in Tables 1, 2 and 3 is arranged to have a field ratio of 90% in an electronic camera having a ⅔ inch photo-taking plane.

An exit point P6' of the ray of light E coming from the second prism 11 is set on the axis z on the minus side of a point P0 of the view finder image forming plane 9. By this arrangement, the optical path length of the view finder is shortened and the value of the coordinate x of the exit point P6' is increased for obtaining a high field ratio and a high field magnification.

TABLE 1

Numerical Example 1 of Essential Points
of First and Second Prisms
$A = 30°$   $C = 22°$   Refractive index $= 1.7725$

| Planes | Coordinates | | |
|---|---|---|---|
| | X | Y | Z |
| P0 (image forming plane) | 0 | 0 | −0.3 |
| P1 | 0 | 0 | 0 |
| P2 | 0 | 0 | 2.3 |
| P3 | 3.984 | 0 | 0 |
| P4 | 8.523 | 0 | 2.620 |
| P5 and P5' | 14.870 | 0 | 6.285 |
| P6 | 17.959 | 0 | −4.491 |
| Exit point P6' of view finder optical axis | 23 | 0 | −4.491 |
| Exit direction cosine of view finder optical axis | 1 | 0 | 0 |
| Optical path length between image forming plane and exit plane | 20.45 | | |

TABLE 2

Numerical Example 2 of Essential Points of
first and second Prisms
$A = 32°$   $C = 24°$   Refractive index $= 1.7725$

| Planes | Coordinates | | |
|---|---|---|---|
| | X | Y | Z |
| P0 (image forming plane) | 0 | 0 | −0.3 |
| P1 | 0 | 0 | 0 |
| P2 | 0 | 0 | 2.5 |
| P3 | 5.126 | 0 | 0 |
| P4 | 10.513 | 0 | 2.628 |
| P5 and P5' | 17.683 | 0 | 6.125 |
| P6 | 20.939 | 0 | −5.229 |
| Exit point P6' of view finder optical axis | 25.6 | 0 | −5.229 |
| Exit direction cosine of view finder optical axis | 1 | 0 | 0 |
| Optical path length between image forming plane and exit plane: | 22.10 | | |

TABLE 3

Numerical Example 3 of Essential Points of
first and second Prisms
$A = 25°$   $C = 21°$   Refractive index $= 1.7725$

| Planes | Coordinates | | |
|---|---|---|---|
| | X | Y | Z |
| P0 (image forming plane) | 0 | 0 | −0.3 |
| P1 | 0 | 0 | 0 |
| P2 | 0 | 0 | 3.2 |
| P3 | 3.814 | 0 | 0 |
| P4 | 7.979 | 0 | 3.495 |
| P5 and P5' | 13.694 | 0 | 8.290 |
| P6 | 15.257 | 0 | −2.831 |
| Exit point P6' of view finder optical axis | 19.4 | 0 | −2.831 |
| Exit direction cosine of view finder optical axis | 1 | 0 | 0 |
| Optical path length between image forming plane and exit plane | 22.31 | | |

Figure 6:
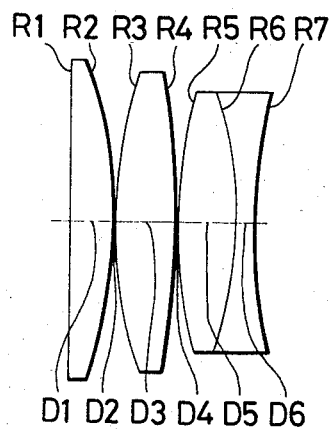
FIG. 6 is a sectional view showing the eye-piece of the view finder optical system embodying this invention.

FIG. 6 shows in a sectional view an eye-piece which is apposite to the view finder optical system according to this invention while a numerical example of the same is as shown in Table 4.

Referring to FIG. 6, the eye-piece includes four lenses arranged in three groups. Three of the four lenses have positive refracting powers and are disposed on the side of the view finder image. The fourth one has a negative refracting power. This arrangement gives an eye-piece with the aberration satisfactorily corrected.

In the numerical example, an adequately aberration-corrected eye-piece can be obtained by setting the radius of curvature of a lens surface Ri and a lens thickness or air spacing Di within ±10%, with a refractive index Ni and an Abbe number Vi of the lens glass being also set within ±10%.

Table 5 shows examples wherein, with the numerical examples 1, 2 or 3 disposed 1 mm behind the exit plane of the second prism 11, the values of Table 4 are multiplied in proportion to the optical path lengths of the first and second prism 10, 11 in such a way as to make the diopter zero.

TABLE 4

Numerical Example of the Eye-piece
$f = 1$, exit pupil position is 0.769 f from vertex
of R7; maximum pupil diameter 0.29 f

| R1 = ∞ | D1 = 0.101 | N1 = 1.6968 | $v1 = 55.5$ |
|---|---|---|---|
| R2 = −1.2790 | D2 = 0.007 | | |
| R3 = 1.0272 | D3 = 0.149 | N2 = 1.56873 | $v2 = 63.1$ |
| R4 = 1.8845 | D4 = 0.007 | | |

TABLE 4-continued

Numerical Example of the Eye-piece
f = 1, exit pupil position is 0.769 f from vertex
of R7; maximum pupil diameter 0.29 f

| | | | |
|---|---|---|---|
| R5 = 1.5412 | D5 = 0.125 | N3 = 1.51633 | ν3 = 64.1 |
| R6 = 1.0757 | D6 = 0.148 | N4 = 1.85026 | ν4 = 32.3 |
| R7 = 1.4010 | | | |

Notes:
Front principal point: −0.0549 from the vertex of R1
Rear principal point: −0.2920 from the vertex of R7

TABLE 5

Various Values in the Numerical Examples

| Numerical Examples | Optical path length between image forming plane P0 and exit plane P6' | Distance between exit plane S6 and first face of eye-piece | Focal length of eye-piece | Field magnification, γ |
|---|---|---|---|---|
| 1 | 20.45 | 1.0 | 20.33 | 0.61 |
| 2 | 22.10 | 1.0 | 21.90 | 0.57 |
| 3 | 22.31 | 1.0 | 22.10 | 0.57 |

Figure 7:
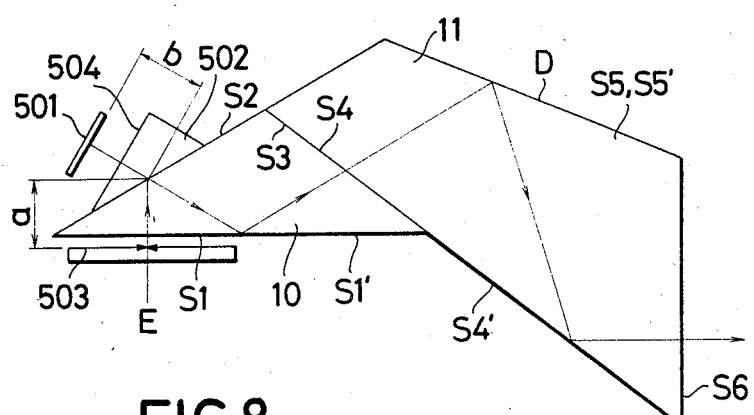
FIG. 7 is an illustration of a prism to be used for the view finder optical system of this invention and an optical system used for information display.
Figure 8:
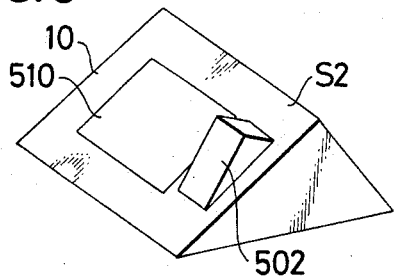
FIG. 8 is an oblique view showing an information display prism employed as a part of the view finder optical system shown in FIG. 7.

In a specific example, the first prism 10 is provided with an information light introducing plane; and while the field magnification is prevented from being lowered, a display is made in the neighborhood of the view finder image to facilitate observation and to have about the same diopter as that of the image. This example is arranged as described below:

Referring to FIG. 7, the illustration includes an information bearing body 501 for an information display; a prism 502 which is cemented to the first reflection plane S2 of the first prism 10; and a focusing screen 503, which is indicated by a reference numeral 9 in FIG. 3. In the case of FIG. 7, optical path length "a" between the focusing screen 503 and the first reflection plane S2 of the first prism 10 is arranged to be equal to an optical path length "b" between the information bearing body 501 and the first reflection plane S2 of the first prism 10. For adequate optical performance, the prism 502 is arranged, for example, in a shape as shown in FIG. 8 to have the information display light flux approximately perpendicularly incident on an incidence plane 504 of the prism 502. To have the view finder light flux reflected, the prism 502 is cemented near the outside of a vapor-deposited reflection part 510 which is provided on the first reflection plane S2 of the first prism 10. In this embodiment, a part of the vapor-deposited reflection part 510 may be arranged into a semi-transparent film and cemented to the prism 502 in an overlapped manner.

When the prism 502 is cemented directly to the first reflection plane S2 of the first prism 10, the prism 502 is preferably made of a glass material which is optically about the same as that of the first prism 10. It is also possible to have the prism 502 made of a plastic material and arranged with a slight air space provided between the first reflection plane S2 and the prism 502.

Figure 9:
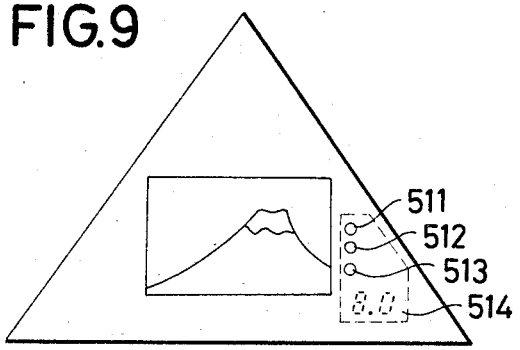
FIG. 9 is an illustration showing by way of example the view finder field of the view finder optical system showin in FIG. 7.

FIG. 9 shows a view finder field. The illustration includes a mark 511 which is arranged to indicate that a flash light is not ready; a mark 512 which is arranged to show whether or not a photographing operation can be performed; a mark 513 which is arranged to show that an image is being recorded; and another mark 514 which is arranged to show an aperture value consisting of seven-segment display figures. In this specific embodiment, all these marks 511, 512, 513, 514 are arranged with light emitting diodes (LED's). As shown in FIG. 9, a large space is available on the lower left and right sides of the picture plane within the view finder field, so that much information can be displayed there.

Figure 10:
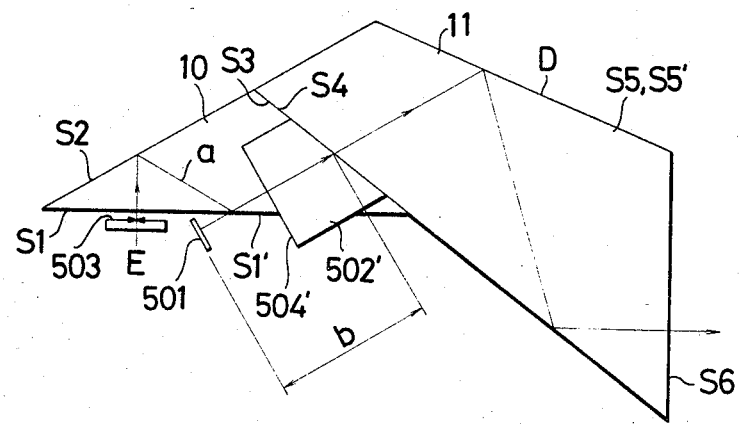
FIG. 10 is an illustration showing a prism used for the view finder optical system of this invention and another embodiment of an optical system for information display.
Figure 11:
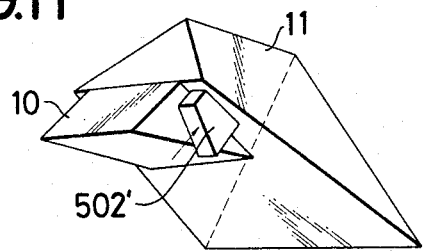
FIG. 11 is an oblique view showing an information display prism employed as a part of the view finder optical system shown in FIG. 10.

FIG. 10 shows another embodiment of the view finder optical system according to the invention. The illustration includes the information member 501 for a display of information; a prism 502' which is cemented to the incidence plane S4 of the second prism 11; and the focusing screen 503. In the case of FIG. 10, the focusing screen 503 is arranged to make the optical path length "a" which extends from the focusing screen 503 via the first and second reflection planes S2 and S1' of the first prism 10 to the incidence plane S4 of the second prism 11 equal to the optical path length "b" extending from the information member 501 to the incidence plane S4 of the second prism 11. For obtaining adequate optical performance, the prism 502' is arranged into a shape, for example, as shown in FIG. 11 to have an information display light flux nearly perpendicularly incident on an incidence plane 504' of the prism 502'. The prism 502' shown in FIG. 11 is disposed as close as possible to the first prism 10 or preferably is cemented to the first prism 10 so that the information can be displayed close to the view finder field. In the case of directly cementing the prism 502' to the incidence plane S4, the prism 502' is preferably made of a glass material which is optically equal to the second prism 11. When the prism 502' is made of a plastic material, the prism 502' is arranged away from the incidence plane S4 leaving a thin air spacing between them.

Figure 12:
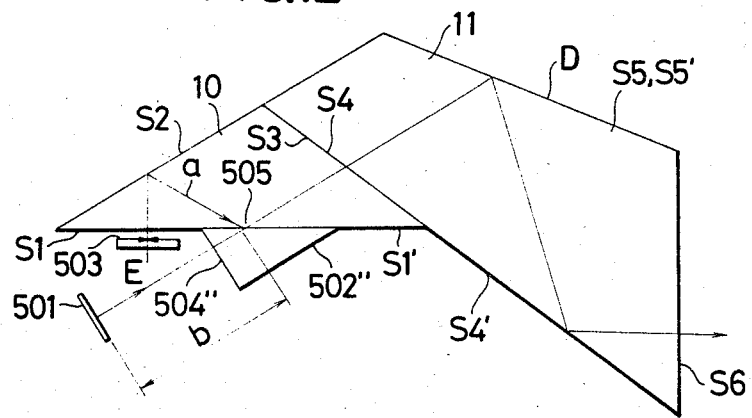
FIG. 12 is an illustration of a prism used for the view finder optical system of the invention and a further embodiment of an optical system for information display.

FIG. 12 shows a further embodiment of the view finder optical system according to the invention. The illustration includes the information member 501 which is provided for a display of information; a prism 502" which is cemented to the second reflection plane S1' of the first prism 10; and the focusing screen 503. In the case of FIG. 12, the optical path length "a" from the focusing screen 503 to a point 505 on the second reflection plane S1' of the first prism 10 is arranged to be equal to another optical path length extending from the information member 501 via the prism 502" to the point 505 on the second reflection plane S1' of the first prism 10.

Figure 13:
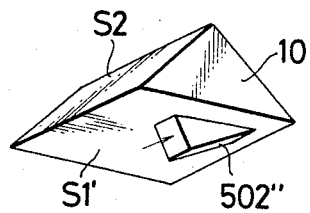
FIG. 13 is an oblique view showing an information display prism employed as a part of the view finder optical system shown in FIG. 11.

For adequate optical performance, the prism 502" is arranged, for example, as shown in FIG. 13 to have an information display light flux approximately perpendicularly incident upon an incidence plane 504" of the prism 502". This arrangement allows the view finder light flux to be readily introduced to any desired position.

Figure 14:
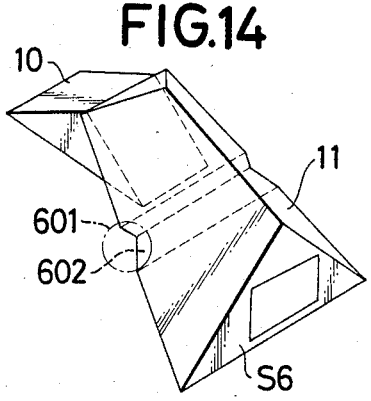
FIG. 14 is an oblique view of an example wherein a prism used for the view finder optical system according to this invention is provided with a notch part.

FIG. 14 shows the essential parts of a high precision view finder optical system, wherein a notch part 601 is provided in a predetermined position in the second prism 11 and a prism for the view finder is held in place by utilizing this notch part 601 for lessening a possible positioning error which arises during the manufacture.

In the case of the embodiment shown in FIG. 14, the notch part 601 is set approximately in the middle part of a distance l (FIG. 5) between the center of a light flux of a view finder image which is not shown and the exit plane S6 of the second prism 11. Preferably, the notch part 601 is arranged within ±15% of the distance l. The notch part 601 includes two planes with one of them arranged to serve as an abutting part to prevent turning movement for a highly precise assembly.

This embodiment is thus arranged to improve the precision of the assembly work by virtue of the notch part 601 which is provided approximately in the middle of the distance l between the image forming center of the view finder image and the exit plane S6 of the second prism 11.

Figure 15:
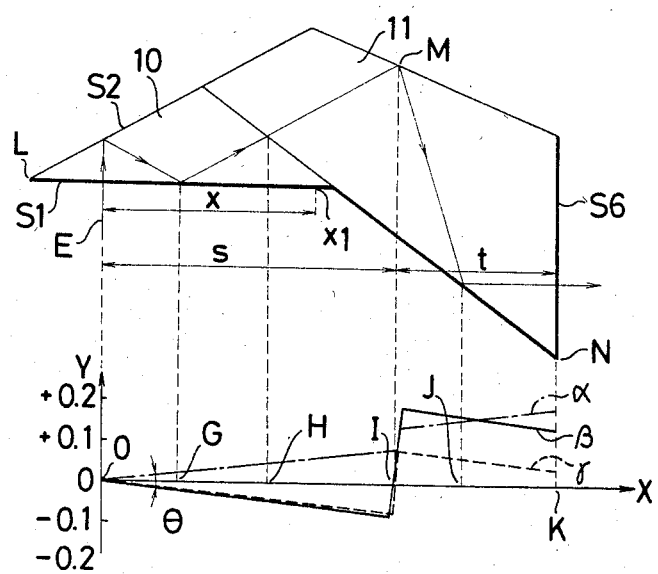
FIG. 15 is an illustration of an optical path deviation resulting from a manufacturing error made on the prism shown in FIG. 14.

The technical importance of the notch part 601 in the middle of the distance l is as follows: FIG. 15 shows how much the center ray E of light of the view finder image deviates from a normal exit point when the prism for the view finder is turned on a certain arbitrarily given point. In this illustration, the view finder prism is turned, for example, about 0.3 degree to have the center ray E incident on one reflection plane S5 of the roof S55'. If the view finder prism is not turned, the center ray E passes points O, G, H, I, J and K on axes X and Y. In case that the turning center of the view finder prism is at the center point L of an edge line formed by the incidence plane S1 and the first reflection plane S2 of the first prism 10 shown in FIG. 3, there is obtained an optical path α as shown in FIG. 15. If it is at another point M of the edge line D of the roof S55', there is obtained an optical path β. If it is at the center point N of the base of the triangular shape of the exit plane S6 of the second prism 11, there is obtained an optical path γ.

As is apparent from FIG. 15, the optical path β has a less degree of exit point deviation than other optical paths α and γ. However, with the view finder prism turned on an arbitrary point, the directional deflection angle of the exit ray of light remains the same if the turning angle is the same regardless of the location of the center of the turn.

Next, the position of the center of turn where the deviating degree of the exit point becomes zero can be obtained as follows: Assuming that, in FIG. 15, the turning angle is θ, a distance $\overline{OI}$ from the incidence point O of the center ray E to the incidence point I on the edge line D of the roof S55' of the second prism 11 is s, a distance $\overline{IK}$ from the reflection point I to the exit plane S6 is t and a distance from the incidence point O to a center of turn at which the degree of deviation becomes zero is x1, the center of turn x1 can be expressed as follows:

$$x1 = \frac{(s+t)\tan\theta}{2s\tan\theta} \times s = \frac{s+t}{2} = \frac{l}{2}$$

This formula shows that, with the center of turn set at a middle point of the distance from the incidence point O to the exit plane S6 on the axis x, the degree of deviation on the exit plane S6 becomes zero. This is the reason for setting the notch part 601 at an approximately middle point of the distance from the incidence point O of the center ray E to the exit plane S6. With the view finder prism kept in place by means of this notch part 601, assembly work can be accomplished at a high degree of precision.

Figure 16:
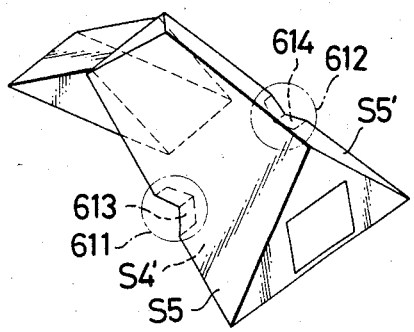
FIGS. 16, 17 and 18 are oblique views of modifications of the prism of FIG. 14.

FIG. 16 shows in an oblique view an example of a modification of the embodiment described in the foregoing. In this example, notch parts 611 and 612 are provided in parts formed by the plane S4' and the reflection planes S5 and S5' of the second prism 11. With plane parts 613 and 614 of these notch parts 611 and 612 used as abutting parts respectively, the view finder prism is prevented from turning to permit assembly work with a high degree of precision.

It is advantageous to have at least one notch part 611, 612 arranged as described in the foregoing as it enables the notch part 611, 612 to efficiently evade the view finder light flux.

Figure 17:
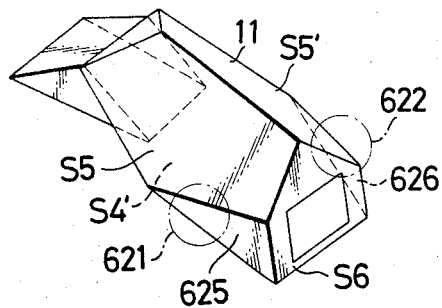

FIG. 17 shows another modification example of the embodiment. In the case of FIG. 17, notch parts 621 and 622 are provided in parts formed in the second prism 11, one by the plane S4' and the reflection plane S5 and the other by the reflection plane S5' and the exit plane S6. With these notch parts 621 and 622 arranged as shown, plane parts 625 and 626 of these notches 621 and 622 serve as abutting parts to prevent the view finder prism from turning so that assembly work can be very precisely accomplished.

In this embodiment, each notch part 621, 622 is preferably formed to have two planes or faces which orthogonally intersect each other. This arrangement facilitates the manufacture and assembly work. The notch part 621, 622 is preferably painted in a block color for prevention of a ghost image.

Table 6 shows a numerical example of the view finder prism arranged according to this invention with the coordinates system which is shown in FIG. 5 used in the table. With the angle A between the incidence plane S1 and the first reflection plane S2 of the first prism 10 and another angle C between the edge line D of the roof S55' of the second prism 11 and the incidence plane S1 determined, all the directions of the normals of planes of the first and second prism 10, 11 can be determined. Further, each plane is unconditionally determined with the normal of the plane and one point on the plane determined. These angles and the coordinates on these planes are as shown in Table 6.

TABLE 6

A numerical Example of View Finder Prism
A = 30° C = 22° Refractive index = 1.834

| Planes | Coordinates | | |
|---|---|---|---|
| | X | Y | Z |
| P0 (image forming plane) | 0 | 0 | −0.3 |
| P1 | 0 | 0 | 0 |
| P2 | 0 | 0 | 2.33 |
| P3 | 4.04 | 0 | 0 |
| P4 | 12.01 | 0 | 0 |
| P5 and P5' | 23.5 | 0 | 2.85 |
| P6 | 23.5 | 0 | 0 |
| Exit point P6' of view finder optical axis | 23.5 | 0 | −4.57 |
| Exit direction cosine of view finder optical axis | 1 | 0 | 0 |

Optical path length between image forming point P0 and the exit plane: 19.81
Distance l between image forming point on axis x and the exit point: 23.5

Figure 18:
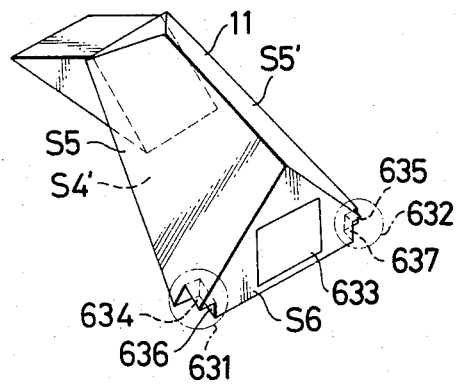

FIG. 18 shows another specific example of a shape suited for holding the prism in place. In this case, notch parts 631 and 632 which are arranged for holding the second prism 11 are formed in parts between the reflection plane S4' and the exit plane S6 of the second prism 11 and between the reflection plane S5' and the exit plane S6. These notch parts 631 and 632 can be arranged without blocking an effective field 633 on the exit plane S6. Therefore, the characteristics of the view finder optical system such as the eclipse of the observation field, the field ratio and the field magnification will never be affected by these notch parts 631, 632.

With plane parts 634 and 635 of these notch parts 631 and 632 kept in place, the second prism 11 can be prevented from tilting downward. Further, with plane parts 636 and 637 of the notch parts 631 and 632 used as abutting parts, the second prism 11 can be prevented from turning over a plane xy.

Figure 19:
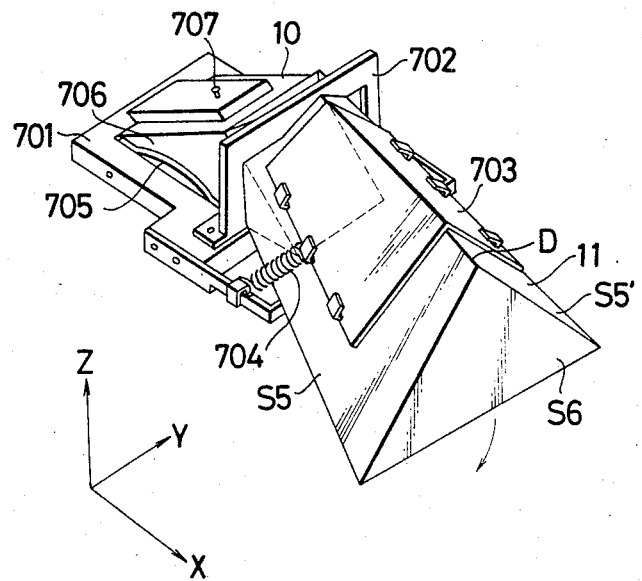
FIG. 19 is an oblique view showing the process of positioning a view finder prism which is arranged according to this invention, omitting the above notch part.

FIG. 19 shows a conceivable method for positioning the view finder prism in reference to the edge line D of the roof S55' as an intermediate step in holding the first and second prisms 10 and 11 at parts of the view finder optical system. In this illustration, the notch parts 631, 632 of the second prism 11 are omitted.

Referring to FIG. 19, a case or framework 701 is arranged to carry the first and second prisms 10 and 11. The case 701 is provided with a carrying member 702 for ensuring the correct position of the roof S55' of the second prism 11. In addition to the member 702, there is provided a member 703 which straddles the two reflection planes S5 and S5' and is under a downward pulling force of a spring 704.

The first prism 10 is positioned with one side 706 thereof pushed by a leaf spring 705 and the position is adjusted in the direction of an axis x by a positioning screw 707. In this arrangement, the second prism 11 tends to slant a little downward under the influences of its own weight and some setting error of the above-stated positioning screw 707. Therefore, in this particular embodiment, the downward slant of the second prism 11 is prevented by providing the notch parts 631,632 in predetermined positions as shown in FIG. 18.

In another conceivable method for attaining this purpose, the base part of a triangular shape formed by the reflection plane S4' and the exit plane S6 of the second prism 11 is chamfered and this chamfered part is arranged to be pushed upward. In accordance with this method, however, the chamfered part leaves little margin between this part and the outermost peripheral rays of light of the field image. Therefore, the method tends to degrade the picture quality. Then, if the length of the second prism 11 is increased for the purpose of preventing it, the optical path length from the view finder image forming plane 9 to the eye-piece 12 increases to lower the magnification for the view finder image. Therefore, such a method is undesirable.

Whereas, in the case of this embodiment, the above-stated problem is solved by providing the notch parts 631, 632 in the specific parts of the second prism 11 as mentioned in the foregoing. Since the view finder prism is set with reference faces provided by this notch arrangement, assembly work can be accurately carried out.

Figure 20:
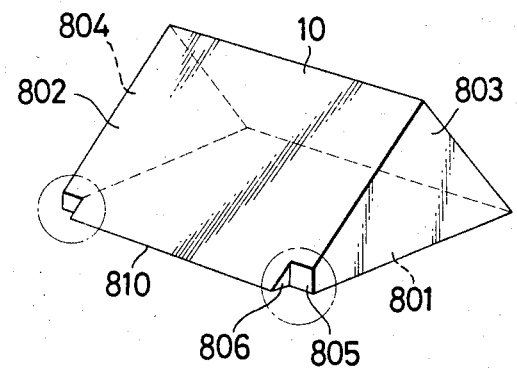
FIG. 20 is an oblique view showing another example of the view finder optical system according to this invention wherein a notch part is provided in a prism other than the prism shown in FIG. 14.

FIG. 20 shows a further example, wherein notch parts are provided in the first prism 10. The notch parts are formed in parts between an incidence plane 801, a first reflection plane 802 and side planes 803 and 804. In positioning the view finder prism in the direction of an axis x, a flat face 805 of each notch part of the first prism 10 is used as an abutting face. In positioning the prism in the direction of an axis y, another flat face 806 of the notch part is used to ensure highly accurate positioning.

Further, in this specific embodiment, the same purpose can be adequately attained by providing only one of the two notch parts.

In the arrangement of this embodiment, an increase in the length of the first prism 10 in the direction of y would not bring about any adverse effect on the optical path length on the view finder optical axis. Therefore, even if a notch is arranged to necessitate such an increase, it would not cause any eclipse or shading of the observation field nor any decrease in the field magnification.

In determining the relative positions of the focusing screen 9 and the view finder prism, use of the exit plane S6 of the second prism 11 as a reference plane is undesirable, because: The unevenness of precision of machining work on the first and second prisms 10 and 11 causes the incident position of light from the focusing screen 9 to the first prism 10 to vary to a great degree.

A light flux which is imaged on the focusing screen 9 expands its width as it comes near to the exit plane S6 of the second prism 11 and thus forms a circular cone shape having its vertex at one point on the focusing screen 9.

Figure 21:
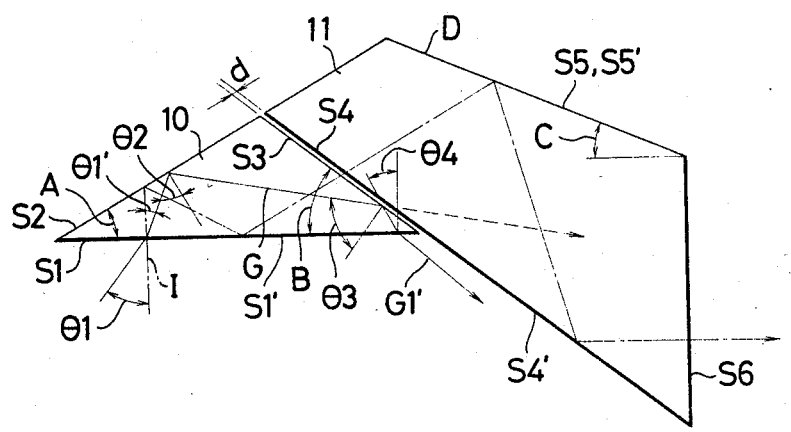
FIGS. 21 and 22 are illustrations showing methods for preventing a ghost image from appearing in the view finder optical system.

Accordingly, even with a part of the light flux eclipsed in the neighborhood of the exit plane S6 which corresponds to the base of the above-stated circular cone shape, the quantity of light decreases only a slight degree. Whereas, if the light flux is eclipsed at the vertex of the circular cone shape, a great decrease in the light quantity appears on the exit plane S6. Therefore, in setting the view finder prism at a part of the view finder optical system, it is preferable to position it by utilizing the first prism 10 which is located close to the focusing screen 9. Meanwhile, an attempt to reduce the size of a view finder optical system which is arranged to have a high field ratio and a high degree of field magnification tends to cause a ghost image. Referring now to FIG. 21, a ghost image appears when a ray of light G which is reflected by the first reflection plane S2 is not reflected by the second reflection plane S1' and comes to the eye-piece 12 passing through the exit plane S3 and the incidence and exit planes S4 and S6 of the second prism 11.

Therefore, an embodiment shown in FIG. 21 is arranged to prevent the occurrence of a ghost image by providing a small clearance between the first and second prisms 10 and 11 for preventing the ray G from coming out from the exit plane S6 by having it totally reflected by the exit plane S3.

Figure 22:
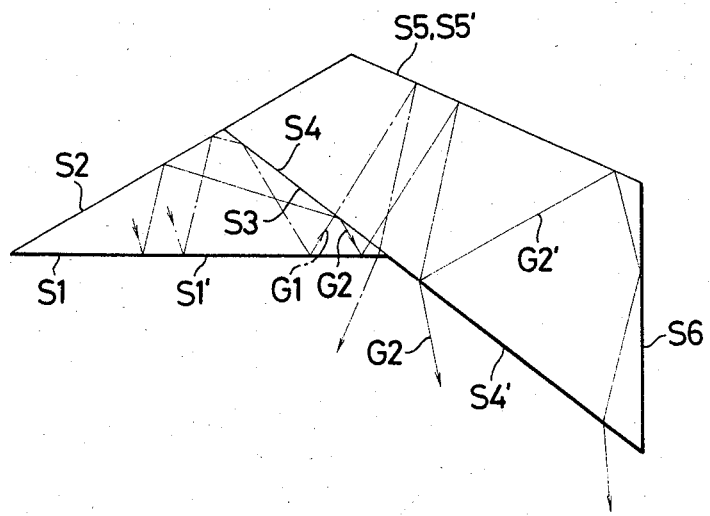

More specifically, a ghost image is prevented from occurring either by causing the ray G to be totally reflected at the exit plane S3 and to come out from the second reflection plane S1' as shown in FIG. 21 or in such a manner as shown in FIG. 22. Referring to FIG. 22, rays G1 and G2 which are further totally reflected at the second reflection plane S1' are allowed to be reflected at the roof S55' after passing through the exit plane S3 and the incidence plane S4. Following that, the rays G1 and G2 are allowed to come out either from the second or fourth reflection plane S1' or S4'.

A ray of light G2' which is totally reflected at the fourth reflection plane S4' is reflected at the roof S55', totally reflected at the exit plane S6 and, after that, eventually comes out from the fourth reflection plane S4', so that a ghost image can be prevented.

In the arrangement of this embodiment, the fourth reflection plane S4' may be arranged to be totally reflective or to have its effective area alone coated with a vapor-deposited reflective film for prevention of a ghost image.

Conditions for totally reflecting any ray of light G at the exit plane S3 are as described below with reference to angles shown in FIG. 21:

Assuming that an angle defined by the incidence plane S1 and the first reflection plane S2 is A and an angle defined by the second reflection plane S1' and the exit plane S3 is B, as shown in FIG. 21, an incidence angle $\theta3$ of the ray G on the incidence plane S3 and an incidence angle $\theta4$ thereof on the second reflection plane S1' respectively can be expressed as shown below:

$$\theta3 = 180° - \theta1' - 2A - B$$

$$\theta4 = 180° - \theta1' - 2A - 2B$$

$$B = 45° - A + C$$

Assuming A=30° and B=37°, the incidence angles can be expressed as follows:

$$\theta3 = 83° - \theta1'$$

$$\theta4 = 46° - \theta1'$$

Assuming that the refractive index n of the material of the prism is n=1.7725 and the incidence angle $\theta$ of light incident upon the incidence plane S1 is $0° \leq \theta1 \leq 90°$, since $0° \leq$ the angle $\theta1' \leq 34.3°$, there obtains the following relation:

$$48.7° \leq \theta3 \leq 83°$$

Then, since the critical angle at the exit plane S3 is 34.3°, the light which is reflected at the first reflection plane S2 and is coming to the exit plane S3 can be totally reflected by the exit plane S3.

The angle of incidence $\theta4$ of the light which is totally reflected by the exit plane S3 to the second reflection plane S1' becomes:

$$11.7° \leq \theta4 \leq 46°$$

Therefore, at the second reflection plane S1', some rays of light is totally reflected while others are allowed to pass through there with the critical angle 34.3° separating them as a border line. A ray of light G' which comes out through the second reflection plane S1' without being totally reflected thereby does not become a ghost image. Further, the rays which are totally reflected by the second reflection plane S1' also do not become a ghost image as mentioned in the foregoing with reference to FIG. 22. Therefore, the ghost image can be prevented by having the rays of light totally reflected anyway at the exit plane S3.

The above-stated angles A and B are set, by way of example, for obtaining a view finder prism which is not only compact in size but is free from ghost images. However, for the sole purpose of preventing a ghost image, it can be attained by setting these angles within the following ranges:

$$20° \leq A \leq 40°$$

$$20° \leq B \leq 60°$$

Further, in the case of a view finder optical system of a high field ratio and a high field magnification to be used for an electronic camera having a small effective image plane, the slanting angle C of the edge line D of the roof S55' is preferably set within the following range for obtaining a compact view finder prism which is capable of preventing the occurrence of a ghost image:

$$10° \leq C \leq 40°$$

It is difficult to satisfactorily attain the above-stated object without satisfying the conditions expressed by the formulas given above.

Considering the possible occurrence of various aberrations of the view finder image, the clearance d between the exit plane S3 of the first prism 10 and the incidence plane S4 of the second prism 11 is preferably set within the following range or thereabout:

$$0.5 \text{ mm} \leq d \leq 0.2 \text{ mm}$$

With the clearance d set within this range, astigmatism can be lessened and the occurrence of a ghost image can be effectively prevented.

In accordance with this invention, as described in the foregoing, a view finder prism which is compact in size and is capable of preventing the occurrence of a ghost image can be obtained for a view finder optical system of an electronic camera.

What is claimed is:

1. A view finder optical system comprising:
    optical path splitting means for dividing a second optical axis from a first optical axis of an objective optical system;
    a predetermined image forming plane arranged on the second optical axis to form thereon an image which is obtained by said objective optical system;
    a first prism arranged behind said predetermined image forming plane to bring about reflection an even number of times on said second optical axis, said second optical axis which comes out from the exit plane of said first prism being arranged to slant relative to an axis perpendicular to said exit plane;
    a second prism which is disposed behind said first prism and is provided with a roof type reflection plane for effecting a first reflection and a reflection plane for further reflecting said second optical axis after said second optical axis is reflected by said roof type reflection plane; and
    an eye-piece having an optical axis which coincides with said second optical axis coming out from said second prism,
    a distance between said first optical axis and the optical axis of said eye-piece being arranged to be shorter than a distance between said first optical axis and said predetermined image forming plane.

2. A view finder optical system according to claim 1, wherein the plane of incidence of said first prism is arranged to be in parallel with a plane which includes said first optical axis.

3. A view finder optical system according to claim 1, further comprising information display means arranged to display information and to provide an information light; and a light guiding prism for guiding said light at least to one of said first and second prisms.

4. A view finder optical system according to claim 3, wherein said light guiding prism is cemented to the first reflection plane of said first prism.

5. A view finder optical system according to claim 3, wherein said light guiding prism is cemented to the second reflection plane of said first prism.

6. A view finder optical system according to claim 3, wherein said light guiding prism is cemented to the plane of incidence of said second prism.

7. A view finder optical system according to claim 1, wherein at least one of said first and second prisms is provided with a notch for positioning said prism on a framework.

8. A view finder optical system according to claim 7, wherein said notch is provided in both ends of an edge formed by the incidence plane and the first reflection plane of said first prism.

9. A view finder optical system according to claim 7, wherein said notch is provided in the second reflection plane of said second prism.

10. A view finder optical system according to claim 7, wherein said notch is provided in both ends of an edge formed by the second reflection plane and the exit plane of said second prism.

11. A view finder optical system according to claim 7, wherein said notch is provided in an edge formed by the second reflection plane and the roof type reflection plane of said second prism.

12. A view finder optical system according to claim 1, wherein said second optical axis which is reflected by said roof type reflection plane takes a hindward direction.

* * * * *